Nov. 26, 1929.    W. J. LALONDE    1,736,923
HOSE COUPLING
Filed April 30, 1927    2 Sheets-Sheet 1
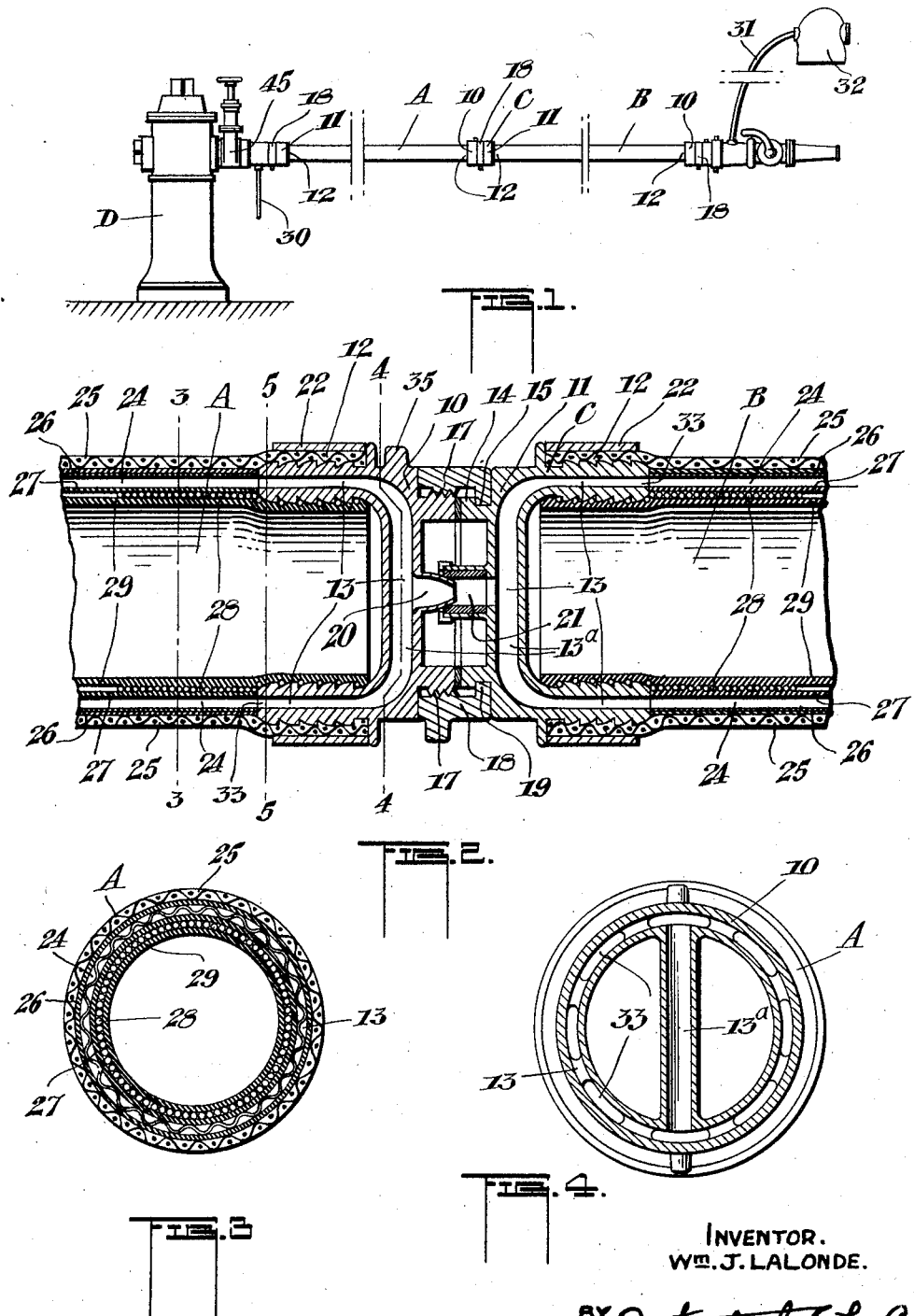
INVENTOR.
Wᵐ. J. LALONDE.
BY Fetherstonhaugh & Co.
ATT'YS.

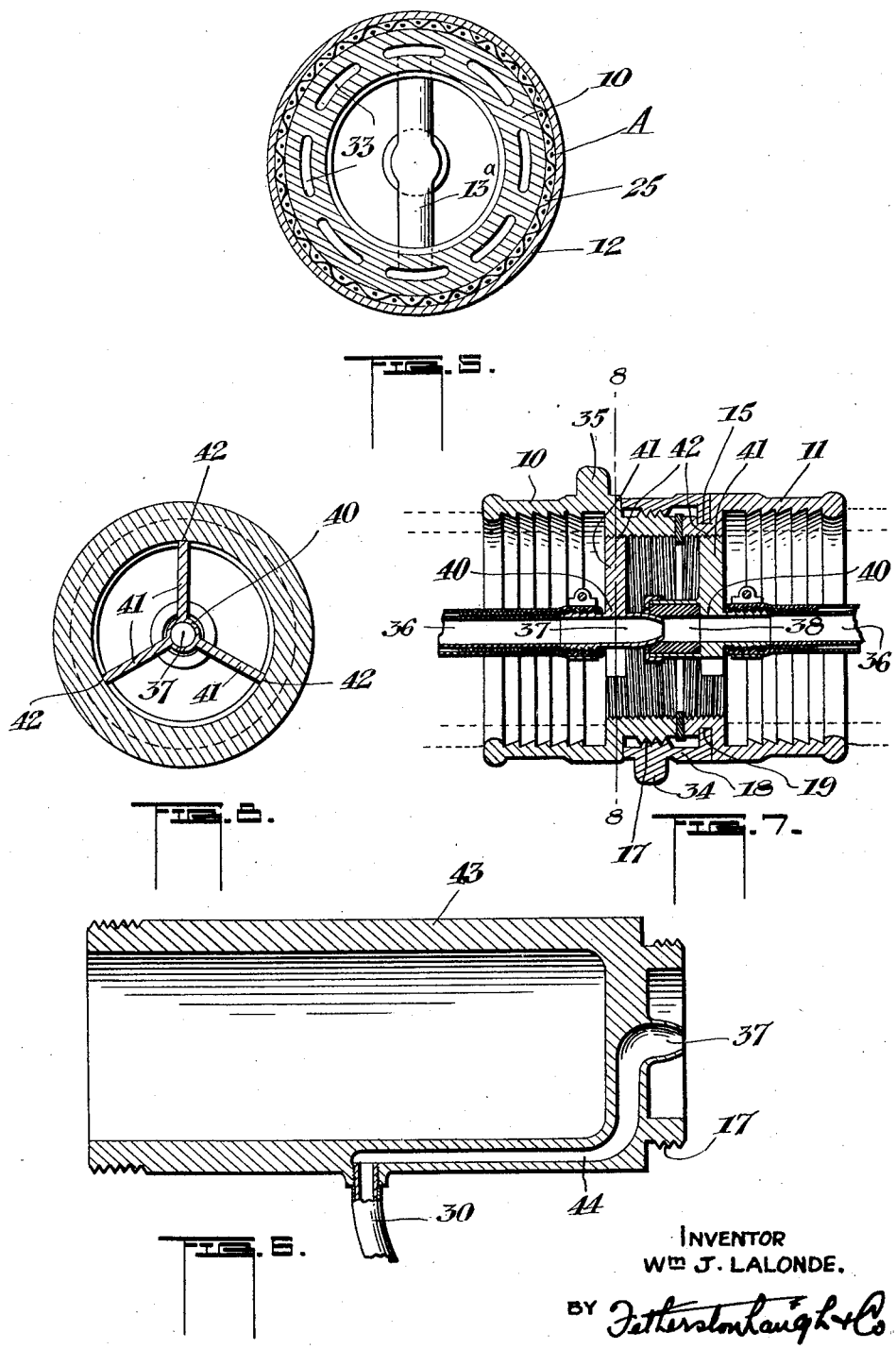

Patented Nov. 26, 1929

1,736,923

UNITED STATES PATENT OFFICE

WILLIAM JAMES LALONDE, OF OTTAWA, ONTARIO, CANADA

HOSE COUPLING

Application filed April 30, 1927. Serial No. 187,850.

This invention relates to improvements in hose couplings and the objects of the invention are to provide a hose and hose coupling adapted for the combined purpose of conveying water and air or oxygen to the user of the hose.

Further objects are to provide a fire hose adapted to supply fresh air as well as water in the extinguishing of fires and which can also be used where fresh air is not necessary for the operators of the hose to supply chemicals and water for the more rapid extinction of fires.

Still further objects are the provision of a hose and hose coupling of this description of durable and simple construction without additional weight and which can be handled efficiently and as readily as an ordinary hose.

Yet another and essential object is to provide means of this character that can be readily incorporated in the existing makes of hose and hose couplings without in any way affecting the construction.

With the foregoing and other objects, hereinafter more fully referred to, in view, the invention consists of the combination with a hose coupling formed with air passageways therein, of a hose formed with an air passageway registering with the air passageways in the coupling.

A modified form of my invention consists in the combination with a hose coupling, of a central air duct through the hose and the coupling.

Referring now to the drawings, in which like characters of reference indicate corresponding parts in each figure, Figure 1 is a side elevation of a hydrant having attached thereto my improved hose and hose coupling.

Figure 2 is a longitudinal section through the hose and hose coupling.

Figure 3 is a section on the line 3—3 of Figure 2.

Figure 4 is a section on the line 4—4 of Figure 2.

Figure 5 is a section on the line 5—5 of Figure 2.

Figure 6 is a longitudinal section of the air or gas intake adapter coupling for the hose, showing the discharge conduit.

Figure 7 is a modified form of hose coupling adapted to fire hose.

Figure 8 is a section on the line 8—8 of Figure 7.

Referring now more particularly to the drawings, in which a preferred example of my invention is disclosed, A and B designate lengths or sections of hose and C my improved coupling, while D illustrates, as illustrated in Figure 1, a hydrant of well known construction to which is attached a hose in well known manner.

The hose coupler C comprises the members 10 and 11 substantially cylindrical in form and of metal, preferably brass, and connected in any suitable manner to the ends 12 of the hose sections A and B. These members 10 and 11 are formed with a circumferential air duct or passageway 13 extending around the sides of the members 10 and 11. As these members, when coupled together, are provided with a gasket therebetween, it is not convenient or practical to have the circumferential air ducts 13 to communicate directly with one another and to overcome this difficulty and at the same time not to interfere with the flow of the water through the hose and the coupling, I provide a bridging duct member 13$^a$ (see Figure 4) in both coupling members communicating with the ducts 13. The members 13$^a$ are provided at the centre with opposing male and female extensions 20 and 21, respectively, adapted, on the coupling members being brought together, to register and interengage, thereby providing a continuous air duct through the sides of the coupling member, across the centre thereof and between one another.

The member 11 is formed with a collar 14 circumferentially channelled as at 15, while the member 10 is formed with a neck externally screw threaded as at 17 to engage with the internally threaded ring member 18 having integral therewith a circumferential flange 19 to engage with the channel 15 (see Figure 2) and thus hold the two sections of the coupling securely together.

It will thus be seen that air from the ducts 13 in each of the members 10 and 11 will circulate freely from one member to the other by means of the hollow male nipple 20 and channel female member 21 forming, in combination, a connecting air duct between the two coupling air ducts 13.

Clamping rings 22 are also provided on the outside of the members 10 and 11 over the ends 12 of the hose sections engaging with externally screw threaded coupling members 10 and 11.

Communicating with the ducts 13 are the air ducts 24 in the hose sections and formed of corrugated material (see Figures 2 and 3). These ducts extend the full length of the hose, which, as here shown, is of special construction, comprising an outer fabric covering 25, beneath which is a layer 26 of rubber and then the corrugated air duct or passageway 24, next to which is another layer 27 of rubber and then cord or wire 28 and then another layer 29 of rubber.

It will thus be seen that air will be readily and continuously supplied to the users of the hose by being taken in at any suitable intake, as at 30, and circulated through the air ducts 24 in the hose and from thence through the air ducts 13 and 13ª in the coupling members and the connecting passageways 20 and 21 forming part of said members.

It will also be understood that gas can be substituted for air and that pressure may be used in any suitable manner to force air or gas therethrough.

For delivering air to the user of the hose, under conditions requiring an auxiliary supply of air, I provide at the discharge end of the hose, as illustrated in Figure 1, a discharge duct 31 which may be of flexible material and can be connected to a helmet or the like 32.

As disclosed in Figure 4, the ends of the air duct 13 in the coupling members 10 and 11 are formed with ports 33 registering with the corrugated circumferential air ducts 24 in the hose itself.

Lugs 34 and 35, of well known constructions, are provided on the clamping ring 18 and the section of the coupling member 10, respectively, to engage with a spanner or the like for tightening purposes.

In Figure 6 is illustrated the adapter coupling 43, illustrating the air intake and discharge duct 44 communicating with the intake pipe 30. By this means air may be taken in in the ordinary way or under pressure and delivered, as aforementioned, through one or more lengths of hose until it reaches the discharge nozzle or pipe 31 communicating through the helmet or an inhaler 32 with the operator of the hose. This adapter coupling is connected to the usual gate valve 45 which is in turn connected to the hydrant D.

The modified form of my invention, as illustrated in Figures 7 and 8, is adapted to existing constructions of fire hose and the like and comprises, in combination with an ordinary fire hose and hose coupling, as shown in Figure 7, a central air duct 36 extending through the hose and the hose coupling and formed in the coupling member with a male hollow nipple portion 37 adapted to engage with the channelled female portion 38 of the opposing coupling member to form a direct and continuous air duct therebetween. This duct may be composed of rubber or any suitable material.

As illustrated in Figure 8, for supporting the central air duct, a circular and centrally arranged metal carrier or bracket 40 is provided, having arms 41 screw threaded at the outer ends, as at 42, to engage with the internally screw threaded portions of the hose couplings 10 and 11.

It will be seen from the foregoing that a continuous flow of fresh air or the like, with or without pressure, may be supplied simultaneously with the flow of water or selectively therefrom. These advantages, as compared with the present system where respiration has to be assisted by oxygen carried with the operator of a hose, will be appreciated, as with my improved apparatus it will be only necessary for the fireman or other person engaged in extinguishing a fire under the most averse conditions to inhale fresh air as required while directing the flow of water through the hose.

By my invention many valuable lives will thus be saved and many other advantages secured in giving confidence and keeping effective the strength of individuals engaged in fighting fires.

As many changes could be made in the above construction, and many apparently widely different embodiments of my invention, within the scope of the claim, constructed without departing from the spirit or scope thereof, it is intended that all matter contained in the accompanying specification and drawings shall be interperted as illustrative and not in a limiting sense.

What I claim as my invention is:

A coupling for uniting adjacent sections of jacketed conduits formed with a central water duct and a surrounding air duct comprising opposed cylindrical flanged members having substantially U-shaped air ducts therein communicating at each end with the air ducts in said sections, central hollow extensions integral with the U-shaped air ducts and designed to fit one within the other to form a single bridging duct connecting the said air ducts to provide a continuous circulation of air through the hose sections and the coupling.

In witness whereof I have hereunto set my hand.

WILLIAM JAMES LALONDE.